(12) United States Patent
Kosicki et al.

(10) Patent No.: US 11,811,085 B2
(45) Date of Patent: Nov. 7, 2023

(54) DEGASSING UNIT AND ELECTRONICS HOUSING, IN PARTICULAR BATTERY HOUSING

(71) Applicant: MANN+HUMMEL GmbH, Ludwigsburg (DE)

(72) Inventors: Juergen Kosicki, Erligheim (DE); Robert Zbiral, Marbach (DE); Sebastian Vaupel, Esslingen (DE); Martin Ziller, Boehmenkirch (DE); Felix Langguth, Unterensingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 73 days.

(21) Appl. No.: 17/328,683

(22) Filed: May 24, 2021

(65) Prior Publication Data

US 2021/0376422 A1    Dec. 2, 2021

(30) Foreign Application Priority Data

May 26, 2020   (DE) ...................... 10 2020 113 999.3

(51) Int. Cl.
*H01M 50/30*        (2021.01)
(52) U.S. Cl.
CPC ................. *H01M 50/394* (2021.01)
(58) Field of Classification Search
CPC ............. H01M 50/394; H01M 50/308; H01M 50/383; H01M 50/342; F16K 24/04
See application file for complete search history.

(56) References Cited

FOREIGN PATENT DOCUMENTS

| CN | 208298910 U | 12/2018 | | |
|---|---|---|---|---|
| DE | 102012022346 A1 | 5/2014 | | |
| DE | 102016110962 A1 | 12/2016 | | |
| DE | 102012022346 B4 | * 3/2018 | .......... | H01M 2/0237 |
| DE | 102018114439 A1 | * 12/2019 | ............. | H01M 2/02 |
| DE | 102018114439 A1 | 12/2019 | | |
| DE | 202020101150 U1 | * 4/2020 | ............. | F16K 17/16 |

* cited by examiner

*Primary Examiner* — Matthew T Martin
*Assistant Examiner* — Bartholomew A Hornsby

(57) ABSTRACT

A degassing unit for an electronics housing has a base body with gas passage opening and is connectable fluid-tightly to a rim of a pressure compensation opening of the electronics housing. A semipermeable membrane for covering the pressure compensation opening enables passage of gaseous media from an environment into the electronics housing interior and vice versa but prevents passage of liquids and solids. A membrane support device, arranged at an interior side of the base body facing the electronics housing interior, engages across the gas passage opening and is positioned at a first distance to the semipermeable membrane. A separation lattice with lattice openings is arranged at the interior side of the base body at a second larger distance to the semipermeable membrane and completely engages across the gas passage opening. A surface area spanned by the separation lattice is larger than a cross section of the gas passage opening.

35 Claims, 6 Drawing Sheets

DEGASSING UNIT AND ELECTRONICS HOUSING, IN PARTICULAR BATTERY HOUSING

CROSS-REFERENCE TO RELATED APPLICATION

This application claiming a priority date of 26 May 2020 based on prior filed German patent application No. DE 10 2020 113 999.3, the entire contents of the aforesaid German patent application being incorporated herein by reference to the fullest extent permitted by the law.

BACKGROUND OF THE INVENTION

The invention concerns a degassing unit and an electronics housing, in particular a battery housing, in particular of a traction battery of a motor vehicle.

Housings for receiving electronic components such as battery cells and the like cannot be closed off completely gas-tightly relative to the environment because, on the one hand, due to temperature fluctuations (for example, by heat introductions by charging or discharging battery cells) and, on the other hand, due to naturally occurring compressed air fluctuations, in particular in mobile systems, a gas exchange between interior and exterior space must be made possible in order to prevent impermissible mechanical loads of the housing, in particular bursting or bulging of the housing. It is however equally important that the penetration of foreign bodies, dirt, and moisture in the form of liquid water is effectively prevented.

Therefore, pressure compensation devices are known which comprise semipermeable membranes which are gas-permeable but liquid-impermeable.

When inside the housing a pressure peak occurs, for example, upon failure of a battery cell in a battery housing, this pressure must be released as quickly as possible because otherwise the housing may become damaged.

As a simplest configuration of a burst protection, for example, in case of lead batteries, it is known to employ burst disks in the meaning of a "rated break point", in particular of a metallic sheet metal material, or safety flaps or valves which are inserted into a housing opening.

In contrast thereto, in case of high-voltage batteries, in particular lithium-based traction batteries with significantly higher storage capacities and power densities, highly specific pressure compensation devices are used which are optimized for fulfilling the aforementioned objects.

DE 10 2012 022 346 B4 discloses a degassing unit for a battery housing that comprises a base body comprising a gas passage opening which is covered by a semipermeable membrane that is permeable for gas but impermeable for liquids, wherein the membrane is stationarily and fluid-tightly connected to the base body, in particular welded. The base body is fluid-tightly connectable to a pressure compensation opening of the battery housing. A gas exchange in normal operation is ensured by the membrane due to its semipermeable properties while, for realization of an emergency degassing function, an emergency degassing spike, arranged at a cover body, is pointing toward the membrane which perforates the membrane upon surpassing a limit expansion induced by an interior housing pressure and causes it to rupture, so that a sudden pressure compensation from the interior to the environment is possible. At an interior side, facing in the mounted state toward the battery housing, an inner protective lattice is connected to the base body which is to prevent an ingress of foreign bodies into the battery housing and which supports the membrane against water pressure from the exterior. The inner protective lattice is connected by hot stamping connections with the base body that is preferably comprised of plastic material and comprises passage openings for screw-connecting the base body to the battery housing, wherein the base body comprises threads formed by metallic thread inserts for engagement of the screws used for the screw connection.

The degassing units known from the prior art have the disadvantage that hot (lithium) particles which in case of a cell defect are released from individual or a plurality of battery cells can pass unhindered through an opened emergency degassing opening into the environment whereby this entails the risk that the surrounding components catch fire and, in the worst case, a vehicle provided with such a battery will be destroyed by the fire.

SUMMARY OF THE INVENTION

It is therefore object of the present invention to provide a degassing unit for an electronics housing, in particular for a battery, in particular for a traction battery of a motor vehicle, that is characterized in that it effectively retains hot particles in the case of a cell defect in the interior of the electronics housing without increasing excessively a pressure loss in the emergency degassing path.

This object is solved by a degassing unit for an electronics housing, in particular for a battery, in particular for a traction battery of a motor vehicle, with a base body connectable fluid-tightly with a rim of a pressure compensation opening of the electronics housing and comprising at least one gas passage opening that is covered by a semipermeable membrane which enables passage of gaseous media from an environment into the electronics housing and in reverse, but prevents passage of liquid media and/or solids, and with a membrane support device arranged at an interior side of the base body which engages at least partially across the gas passage opening and is positioned at a first distance away from the semipermeable membrane, wherein the base body comprises at least one fastening means action region that is configured for an attachment of the degassing unit to the electronics housing, wherein at the interior side of the base body at a second distance away from the semipermeable membrane that is larger than the first distance, a separation lattice with a plurality of lattice openings is arranged, wherein the separation lattice completely engages across the gas passage opening, wherein a surface area spanned by the separation lattice is larger than a cross section of the gas passage opening.

The object is further solved by an electronics housing, in particular battery housing, in particular of a traction battery of a motor vehicle, that comprises at least one housing wall with a pressure compensation opening, wherein in the electronics housing preferably battery cells can be arranged, wherein the pressure compensation opening is closed by a degassing unit, wherein the degassing unit is a degassing unit as disclosed and claimed.

Preferred further developments of the invention are disclosed in the dependent claims.

Advantages of the invention result from the description and the drawings. Also, the aforementioned and still to be disclosed features can be used according to the invention individually by themselves, respectively, or a plurality thereof in any combinations. The illustrated and described embodiments are not to be understood as final listing but have instead an exemplary character for describing the invention.

According to the present patent application, the term degassing unit has been selected for the device according to the invention. However, it is of course understood that the device according to the invention likewise permits venting of an interior of the electronics housing through the (porous) membrane and the device according to the invention can therefore also be referred to as "pressure compensation unit" or "venting unit".

The relative terms "interior" and "exterior" used herein relate to a mounting state in respect to the electronics housing wherein "interior" means pointing toward the electronics housing and "exterior" pointing toward the environment.

According to a first embodiment of the degassing unit for an electronics housing, in particular for a battery, in particular for a traction battery of a motor vehicle, it comprises a base body which is connectable fluid-tightly to a rim of a pressure compensation opening of the electronics housing and which comprises at least one gas passage opening covered by a semipermeable membrane. The membrane enables a passage of the gaseous medium from an environment into the electronics housing and vice versa, prevents however the passage of liquid media and solids. Moreover, the degassing unit comprises a membrane support device arranged at an interior side of the base body which engages across the gas passage opening at least partially and is positioned at a first distance away from the semipermeable membrane. The base body comprises in particular at its inner and/or exterior side at least one fastening means action region which is configured for fastening the degassing unit to the electronics housing. According to the invention, at a second distance away from the semipermeable membrane that is larger than the first distance, a separating lattice with a plurality of lattice openings is arranged at an interior side of the base body and completely engages across the gas passage opening.

The dimensions of the lattice openings of the separation lattice are to be selected such that a proportion as large as possible of a particle fraction, produced in case of a battery cell defect, is retained thereby in order to prevent that the particles reach the environment. The particles which are produced in case of a cell defect are glowing metal and/or alkali metal particles which, together with possibly produced flammable gases produced in a cell defect, may represent an ignition source. The dimensions of the lattice openings are selected such, for example, that a certain mass proportion of the particles, approximately >75%, can be retained. For this purpose, the separation lattice is manufactured of a sufficiently thermally resistant material; preferably the melting temperature of the material is above 800° C., in particular above 1,000° C. In that the membrane support device and the separation lattice are provided at different distances away from the membrane in accordance with the invention, wherein the separation lattice is farther removed from the membrane, a pressure loss as small as possible is ensured in the emergency degassing situation.

The surface area which is spanned by the separation lattice is greater than a cross-sectional area of the gas passage opening which provides the advantage that the surface area in the separation lattice that is available for particle separation is enlarged. This contributes to the separation lattice not blocking so quickly (clogging) in case of gas streams that are greatly particle-loaded. The devices known from the prior art with only one support lattice do not realize this advantage because there the flow cross section available for particle separation is limited by the dimensions of the gas passage opening.

The first distance by which the membrane support device is removed from the membrane surface, can amount to between 0.1 mm and 1.0 mm, preferably between 0.5 mm and 0.8 mm. The first distance can however also amount to "zero" so that the membrane is already contacting the membrane support device in the state of rest. The second distance by which the separation lattice is spaced apart from the membrane surface can be larger than 0.5 mm, preferably larger than 1 mm, more preferred larger than 1.5 mm.

In a preferred embodiment, the membrane support device is also designed to be fluid-permeable, preferably as lattice section with a plurality of lattice openings. This has the technical advantage that the cross section of the membrane support device, in particular in the emergency degassing situation, can also be flowed through which reduces the pressure loss further and increases in this way the speed of the pressure release in the housing.

Moreover, it is preferred that the separation lattice is connected particle-tightly to the base body.

According to a further embodiment, the dimensions of the lattice openings of the separation lattice in at least one extension direction can be smaller than 2.0 mm, preferably smaller than 1.2 mm, more preferred smaller than 0.9 mm. According to findings of the applicant, the aforementioned requirements with regard to a gravimetric collection efficiency can be realized with such dimensions.

The membrane can be present at the interior side of the base body and can be engaged from behind at least partially by the support device so that the latter supports the membrane against external pressure actions (e.g. against water pressure in case of traveling through water and/or use of cleaning devices for vehicles) and prevent impermissible deformations.

A contact at or connection of the membrane to the interior side of the base body has the advantage that the membrane is held in case of inner pressure action essentially with form fit relative to the base body and the connection (welding, gluing or the like) is not loaded by tensile load which can be important in particular in case of use of PTFE materials that are already difficult to join. In order to also prevent for inner pressure action an impermissibly strong bending or "bulging" of the membrane which can lead to its destruction, the base body can comprise additionally an outer protective lattice for the membrane which spans across the membrane surface externally at least partially but is fluid-permeable with a sufficiently large surface proportion in order to enable gas exchange in normal operation.

The separation lattice serves moreover as an ingress protection into an interior of the electronics housing so that objects such as, for example, screwdrivers or the like, cannot reach the interior. This is in particular important because traction batteries for vehicles are operated frequently in the high-voltage range and this presents imminent dangers. The separation lattice can comprise a plurality of spaced apart lattice stays whose minimum distance is to be selected such that an insertion can be safely prevented. The lattice stays can be arranged in a rectangular pattern or as a combination of circumferentially extending and radially extending lattice stays.

The separation lattice can comprise preferably a metal or can consist thereof. A separation lattice of metal has the important advantage that even after a high-temperature action the protective and separation function is maintained for which reason it is preferably used in accordance with the present invention. Alternatively, the separation lattice can comprise a plastic material or consist thereof, preferably polypropylene and/or polybutylene terephthalate, each preferably comprising reinforcement fibers, in particular glass fibers.

The base body can be comprised substantially of plastic material, in particular thermoplastic plastic material, and in particular be injection molded. Preferred materials are polypropylene, polybutylene terephthalate, or polyamide, each comprising reinforcement fibers, in particular glass fibers.

For the semipermeable membrane, all materials can be used which comprise a gas permeability for venting in normal operation and a sufficiently high water impermeability. As a preferred material for the semipermeable membrane, polytetrafluoroethylene (PTFE) can be used. The semipermeable membrane comprises an average pore size that can lie between 0.01 μm and 20 μm. The porosity lies preferably approximately at 50%; the average pore size amounts preferably to approximately 10 micrometers.

The semipermeable membrane can be preferably designed as a film-type or film-shaped or a disk-shaped thin membrane. The gas-permeable membrane comprises a membrane surface effective for gas permeation which can comprise at its outer circumference preferably a rectangular or a round outer contour. It is understood however that the outer circumference of the membrane can also be designed differently. The membrane is preferably a thin flat membrane whose membrane surfaces that are effective for gas permeation and are facing away from each other are embodied substantially parallel to each other and preferably are substantially planar.

The membrane thickness of the membrane is much smaller than its remaining outer dimensions. The membrane can span across a minimum width and/or minimum length or a minimum outer diameter of equal to or larger than 20 mm, preferably of equal to or larger than 30 mm, in particular of equal to or larger than 40 mm. The membrane thickness can be smaller in particular at least 20 times, preferably at least 40 times, in particular at least 100 times, than its minimum width and/or the minimum length or the minimum outer diameter of the membrane. The membrane thickness can amount to 1 micrometer to 5 millimeter, wherein a membrane thickness of 0.1 to 2 mm, in particular 0.15 to 0.5 mm, is preferred.

In yet a further embodiment, the separation lattice can bulge in a cup shape in a direction that is pointing inwardly in a mounted state. Due to the cup-shaped bulging, an even larger effective surface is provided for the particle separation which, in particular in case of an emergency degassing, further reduces the pressure loss.

Alternatively, the separation lattice can be designed substantially planar which, for a limited installation space within the electronics housing, has advantages because in this way minimum distances to current-conducting components that may have to be maintained can be observed more easily.

In a preferred further embodiment, the degassing unit comprises at least one spacer that keeps the separation lattice at the second distance away from the membrane and that is embodied to either project axially inwardly away from the base body or axially outwardly away from the separation lattice. When the spacer is embodied to project axially inwardly away from the base body, the separation lattice is resting on a free end of the spacer while the free end of the spacer is resting on the base body in an embodiment of the spacer projecting axially outwardly away from the separation lattice. In particular, a plurality of spacers can be provided which are in particular arranged in circumferential distribution.

According to a particularly preferred embodiment, the dimensions of the lattice openings of the membrane support device are larger than the dimensions of the lattice openings of the separation lattice. For example, the dimensions of the lattice openings of the membrane support device can be at least 4 times, preferably at least 6 times, larger than the dimensions of the lattice openings of the separation lattice in the extension direction with the smallest dimension. This is based on the idea that for fulfilling the membrane support function no such tight mesh lattice is required. A protective function for ensuring an ingress protection (IP code) is realized in this context by the correspondingly dimensioned lattice openings of the separation lattice.

The separation lattice and the membrane support device can be designed separate from each other. In a particular embodiment, the membrane support device can be designed as one piece together with the base body or can be detachably or non-detachably connected to the base body.

Alternatively, the separation lattice and the membrane support device can also be designed as one piece. In particular, in this context the membrane support device, in particular the lattice section of the membrane support device, can be embodied as an axial support bulge of the separation lattice, wherein the support bulge is preferably centrally arranged in relation to the gas passage opening. The membrane support device which is provided by the support bulge is closer to the membrane than the separation lattice, wherein the support bulge is bulging in an outwardly pointing direction in a mounting state. The separation lattice with "integrated" membrane support device can be produced in this context particularly easily and inexpensively by shaping and stamping from a planar sheet metal section.

In yet another embodiment, the separation lattice can support a filter medium that preferably comprises a lattice material, in particular a wire lattice, and/or a nonwoven material. The filter medium comprises in particular a metallic material or consists thereof. The filter medium can be supported in this context by support lattice stays of the separation lattice which, in combination with a filter medium, have a significantly greater distance from each other than in an embodiment without filter medium; the distances between the support lattice stays can be, for example, several millimeters, for example, 1.5 mm to 35 mm, preferably 2 mm to 30 mm. In this case, the opening cross sections relevant in relation to the separation are determined by the dimensions of the openings of the lattice material and/or by the pore size of the nonwoven material.

Moreover, the separation lattice can be non-detachably or detachably connected to the base body, in particular can be snapped onto the base body. For securing a particle density as good as possible of the connection of the separation lattice and base body, the separation lattice can engage across the base body radially outwardly at least partially in circumferential direction. In a preferred embodiment, snap-on means are provided in the region of the radially outer engagement.

In a particular preferred embodiment, a distance between the separation lattice and the membrane support device in a region of the center of the gas passage opening can amount to at least 0.2 mm, preferably at least 0.7 mm, wherein even greater values are advantageous in regard to a reduced pressure loss.

Moreover, the fastening means action region of the base body may comprise a bore, in particular a blind bore, that is open in particular toward the interior or exterior side of the base body. A corresponding fastening means can be brought into engagement, from the housing interior or housing exterior of the electronics housing, with this bore.

The separation lattice is preferably embodied as a sheet metal part, in particular as a stamped sheet metal part. This enables an inexpensive manufacture even in mass production operation. Alternatively or additionally, the openings of the separation lattice can also be produced by other methods, for example, by (laser) cutting. Preferably, the separation lattice has at least one push-through opening which is aligned with the at least one blind bore of the base body. For attachment of the degassing unit at the electronics housing, a screw can be guided through the push-through opening which, according to this embodiment, also holds fast the separation lattice safely in relation to the opening of the electronics housing in case of a thermal action.

Moreover, the membrane can be connected circumferentially to a rim of the gas passage opening of the base body, in particular welded, preferably at an interior side of the base body. Alternatively, the membrane can also be glued or secured by friction, for example, by clamping. The porous PTFE membrane materials, described herein as preferred, can be welded with a plastic base body without problem or can be connected in a different way by material fusion.

In a further preferred embodiment, the separation lattice comprises at least one fastening tab with an opening. The fastening tab extends in particular in radial direction away from a lattice body of the separation lattice. The fastening tab is suitable to connect the separation lattice immediately to a wall of the electronics housing. An immediate connection of the particularly metallic separation lattice to the particularly metallic wall of the electronics housing has the advantage that the separation lattice after a strong thermal action (e.g. fire and/or cell defects) remains fastened safely in relation to the wall of the electronics housing and is still able to perform its separation function.

Moreover, the degassing unit can comprise a covering hood which is connected at the exterior side to the base body, wherein the covering hood comprises preferably at least one venting opening.

The covering hood ensures that the membrane cannot be damaged from the exterior either by foreign bodies, for example, pointed objects such as screwdrivers or the like, or by means of high-pressure cleaners and/or steam cleaners and in this way contributes effectively to a high IP protection class.

A further also preferred embodiment provides that the covering hood is fastened by means of a locking element engagement to the base body. The locking element engagement can be realized in this context, for example, at the outer circumference of the base body or, in a broader meaning, at the end face at its exterior side. For attachment of the covering hood at the base body, other fastening means are however conceivable, for example, form fit or friction fit fastening means, for example, screws or clips, or by means of material fusion connections, in particular (friction) welding.

As materials for the base body and/or the covering hood, in particular plastic materials are conceivable, preferably thermoplastic plastic materials, that can be processed by injection molding. Preferably, the base body and/or the covering hood is comprised of polypropylene, polybutylene terephthalate or polyamide, each optionally comprising reinforcement fibers, in particular glass fibers, or at least comprises at least one of these materials.

Alternatively or additionally, the degassing unit can comprise a housing seal which circumferentially surrounds the gas passage opening of the base body at its interior side. The housing seal can be embodied as an axial or radial seal, i.e., in particular can be present at an end face (in case of the axial seal) or at a wall surface (in case of the radial seal). The housing seal can be embodied as an O-ring which is received in a corresponding groove of the base body or as a molded-over sealing component. An arrangement of the housing seal in axial configuration is preferred wherein, particularly preferred, the housing seal surrounds a bayonet connecting means which in particular projects axially. The housing seal can be in particular also embodied as a shaped seal with a non-circular cross section, in particular elongated in longitudinal direction.

Moreover, the degassing unit can comprise an emergency degassing spike that is extending externally in axial direction toward the membrane and whose tip in a state of rest is present at a predetermined distance away from an outer membrane surface. The emergency degassing spike can be embodied in this context either at the base body or at the covering hood. The emergency degassing spike in a state of rest (no differential pressure load) is arranged at a predetermined distance in relation to the membrane surface. Under pressure load (relative inner excess pressure), the membrane will bulge in the direction toward the exterior space and, upon reaching a limit pressure, will contact the tip of the emergency degassing spike. Due to its tip, the emergency degassing spike causes then a targeted weakening of the membrane so that the latter ruptures. This serves for ensuring an emergency degassing function that acts as quickly as possible which is important in order to be able to ensure in case of a sudden inner pressure increase in the electronics housing that the housing structure remains intact. Due to a variation of the distance of the tip of the emergency degassing spike from the membrane surface, the emergency degassing pressure is adjustable.

A further aspect of the invention concerns an electronics housing, in particular a battery housing, in particular of a traction battery of a motor vehicle. As further possibilities of use of the degassing unit according to the invention aside from traction batteries, switch cabinets or transformer housings are conceivable, for example. The electronics housing has at least one housing wall with a pressure compensation opening wherein in the electronics housing preferably battery cells can be arranged and wherein the pressure compensation opening is closed by a degassing unit according to the invention so that a gas exchange between an interior of the electronics housing and the environment is possible but the penetration of moisture, dirt, and foreign bodies is effectively prevented.

In this context, in particular mounting of the degassing unit is provided such that the latter is connected by means of at least one fastening means, in particular a screw, to a wall of the electronics housing wherein the fastening means is in engagement with the fastening means action region of the base body. Due to the screw connection, the required sealing clamping forces for compression of the housing seal are generated. The screw connection can be in particular realized from an interior of the electronics housing. Of course, also embodiments are encompassed by the invention in which the screw connection of the degassing unit with the electronics housing is realized from the exterior side.

Particularly preferred, the separation lattice is secured indirectly or directly with form fit between the wall of the electronics housing and the base body of the degassing unit, essentially sandwich-like clamped therebetween. In this way, it is made possible that the separation lattice in case of a thermal action can remain also safely fastened in relation to the opening of the electronics housing.

According to a preferred embodiment, the separation lattice is connected immediately to a wall of the electronics housing, in particular by at least one metallic fastening element, in particular by at least one screw. Preferably, the screw is guided through the opening of the at least one fastening tab of the separation lattice. A particularly metallic direct connection of the separation lattice with the wall of the electronics housing has the advantages described in the preceding paragraph.

Finally, the housing wall can comprise at an exterior side a sealing surface surrounding the pressure compensation opening at which the housing seal of the degassing unit is resting in a mounted state. The sealing surface is preferably embodied as a region of the wall of the electronics housing with deviations with respect to flatness as minimal as possible and minimal roughness. In a suitable manner, the electronics housing or at least its wall comprises a metal material or consists thereof so that the sealing surface with regard to the aforementioned properties can be obtained simply by mechanical processing.

BRIEF DESCRIPTION OF THE DRAWINGS

Further advantages result from the following drawing description. In the drawings, embodiments of the invention are illustrated. The drawings, description, and claims contain numerous features in combination. A person of skill in the art will consider the features expediently also individually and combine them to expedient further combinations.

DESCRIPTION OF PREFERRED EMBODIMENTS

Figure 1:
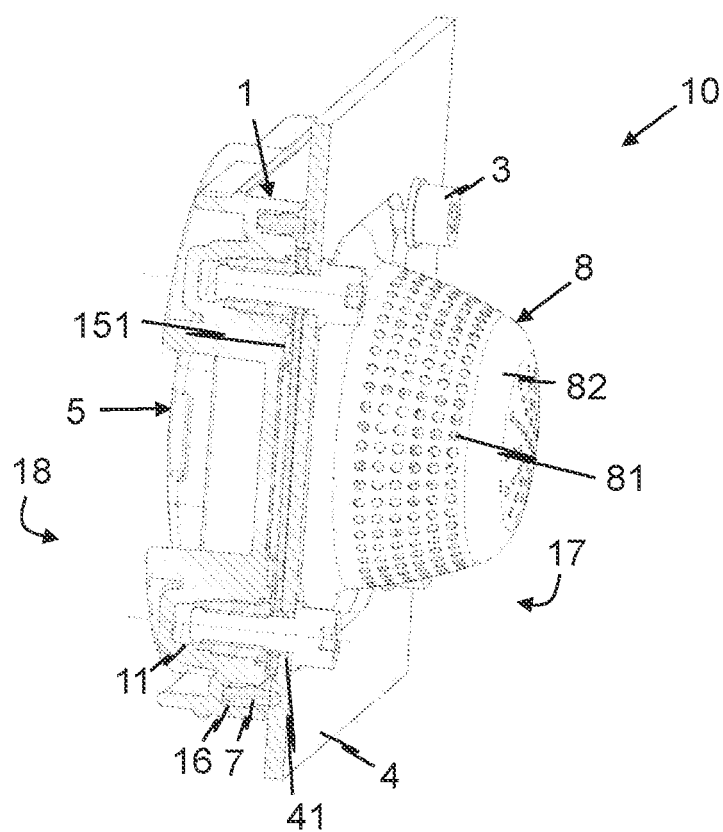
FIG. 1 shows an isometric section view of a degassing unit according to the invention according to a first embodiment.

In the Figures, same or same type components are identified with same reference characters. The Figures show only examples and are not to be understood as limiting. Features or feature combinations which are disclosed in connection with a certain embodiment are intended to also apply—if not explicitly excluded—also onto other embodiments.

All Figures show the degassing unit 10 according to the invention in an installed state with a section of a wall 4 of an electronics housing, in particular for a battery, in particular for a traction battery of a motor vehicle.

Figure 2:
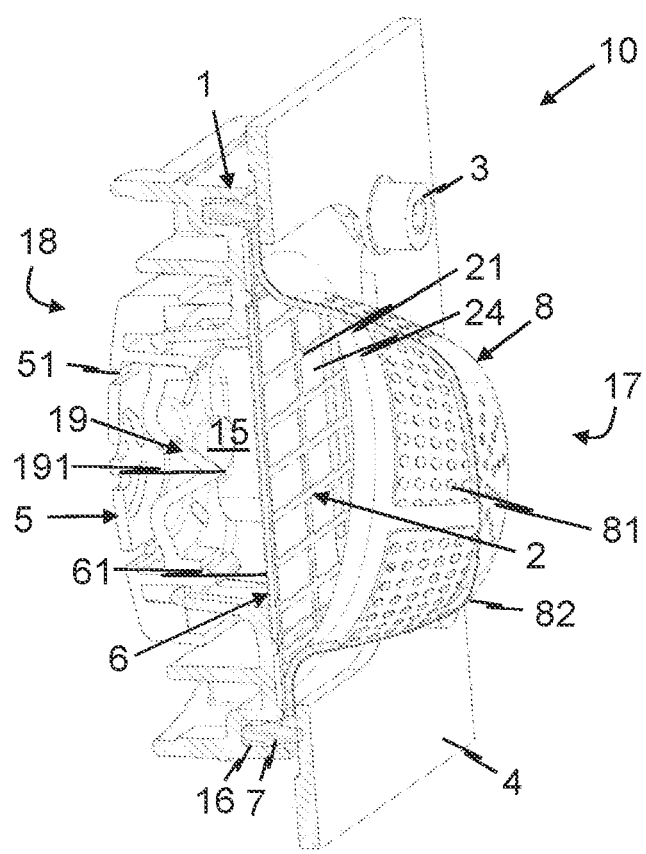
FIG. 2 shows a further isometric section view of the degassing unit according to the invention according to the first embodiment.

In FIG. 1 and FIG. 2, a first embodiment of the degassing unit 10 according to the invention is illustrated in an isometric section illustration. It comprises a base body 1 which is connected by a screw connection at the exterior side to a rim of a pressure compensation opening of an electronics housing, in particular of a battery housing of a traction battery. The screw connection comprises a plurality of screws 3 as well as corresponding fastening means action regions 11 of the base body into which the screws are screwed. The screws 3 extend respectively through through bores 41 of the wall 4 of the electronics housing. The degassing unit 10 is mounted at the exterior side at the electronics housing and is screwed on from the interior side. For fluid-tight sealing action of the base body 1 of the degassing unit 10 with the wall 4 of the electronics housing, the housing seal 7 is provided which is compressed by the sealing pretensioning force applied by the screws 3. The housing seal 7 is arranged in a seal receiving groove 16 of the base body 1 and is secured therein by a "bulgy" cross section region so that it does not drop out during mounting.

The base body 1 has in addition a gas passage opening 15 through which a pressure compensation between electronics housing interior and the environment as well as in reverse can take place.

Moreover, the degassing unit 10 comprises a semipermeable membrane 6 which is permeable for gaseous fluids, but prevents passage of solid bodies and liquids. Preferably, the membrane is embodied as a porous PTFE film. The semipermeable membrane 6 is connected fluid-tightly to the base body 1 at the interior side 17 around the gas passage opening 15 of the base body 1, preferably welded or glued, namely to the rim 151.

The gas passage opening 15 or the membrane 6 is covered further by a fluid-permeable membrane support device 2 which is positioned at a first distance away from the membrane 6. The membrane support device 2 has a plurality of lattice stays 21 between which a plurality of lattice openings 24 are present. The membrane support device 2 in the present embodiment is embodied as a stamped sheet metal part.

At its exterior side 18, a covering hood 5 is connected to the base body 1 which comprises at least one venting opening 51 and which is configured to provide protection for the sensitive membrane 6 so that the latter cannot be damaged from the exterior either by foreign bodies, for example, pointed objects such as screwdrivers or the like, or by means of high-pressure cleaners and/or steam cleaners. Construction and dimensioning of the covering hood contribute thus significantly to a high IP protection class.

Moreover, the degassing unit 10 comprises a separation lattice 8 that comprises a plurality of openings 81. The separation lattice 8 is present at a second distance away from the membrane 6 that is larger than the first distance at which the membrane support device 2 is positioned. The openings 81 of the separation lattice 8 are moreover smaller than the openings 24 of the membrane support device 2 and provide an ingress protection so that long and pointed objects (for example, wires, screwdrivers or the like) cannot be introduced into the electronics housing interior. The separation lattice 8 is embodied as a bulged cup 82 that bulges in an inwardly oriented direction. By means of the separation lattice 8, particles which in case of a cell defect will be released from individual or a plurality of battery cells can be retained in the housing interior. The dimensions of the lattice openings 81 of the separation lattice 8 are to be selected such that a proportion of a particle fraction as large as possible is retained thereby in order to prevent that they reach the environment. The dimensions of the lattice openings 81 of the separation lattice are selected such, for example, that a certain mass proportion of the particles, for example, >75%, can be retained. The cup shape of the separation lattice 8 enlarges the surface area that is available for particle separation in comparison to a planar embodiment and reduces therefore the tendency of the separation lattice 8 to block in case of strongly particle-loaded gas flows. An enlarged surface of the separation lattice 8 has moreover the advantage that thermal peaks are distributed across a larger surface area, which reduces the risk of thermally caused structural damages.

According to the illustrated embodiment, the separation lattice 8 is connected in a particle-tight way to the base body 1 in that it is clamped sandwich-like between the wall 4 of the electronics housing and the base body 1. For facilitating assembly of the degassing unit 10, the separation lattice 8 can be additionally at least prefixed in relation to the base body 1; for this purpose, all connecting types (for example, gluing) that appear suitable to a person of skill in the art are conceivable.

The base body 1 comprises moreover an emergency degassing spike 19. The latter extends toward the membrane 6 and is arranged in the state of rest (no differential pressure load) at a predetermined distance away from the outer membrane surface 61. Under pressure load (relative inner pressure), the membrane 6 will bulge in the direction toward the exterior space and upon reaching a limit pressure will contact the tip 191 of the emergency degassing spike 19. Due to its tip 191, the emergency degassing spike 19 then produces a targeted weakening of the membrane 6 so that the latter ruptures. This serves for securing an emergency degassing function that reacts as quickly as possible which is important in order to ensure in case of a sudden inner pressure increase in the electronics housing that the housing structure remains intact. Due to a variation of the distance of the tip 191 of the emergency degassing spike 19 relative to the membrane surface 61, the emergency degassing pressure is adjustable.

Figure 3:
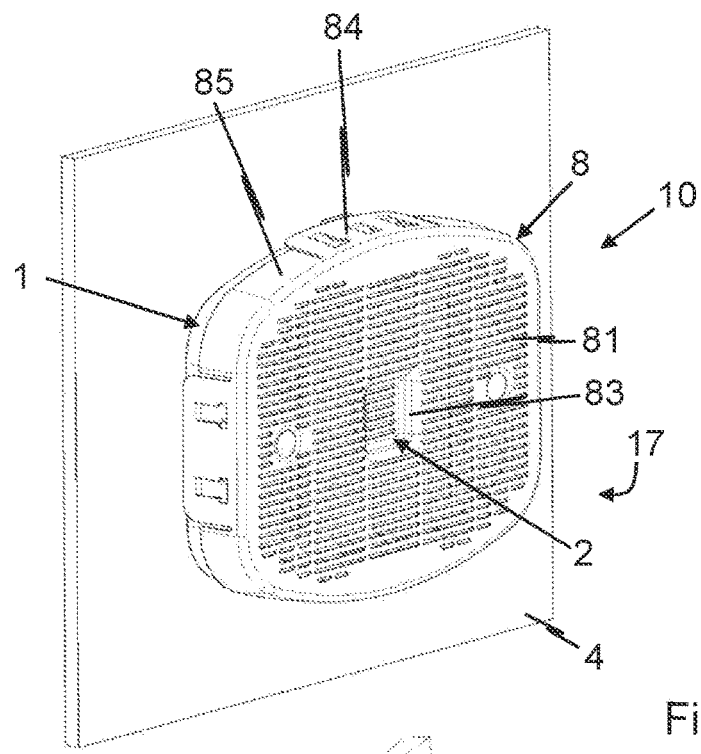
FIG. 3 shows an isometric view of a degassing unit according to the invention according to a second embodiment.
Figure 4:
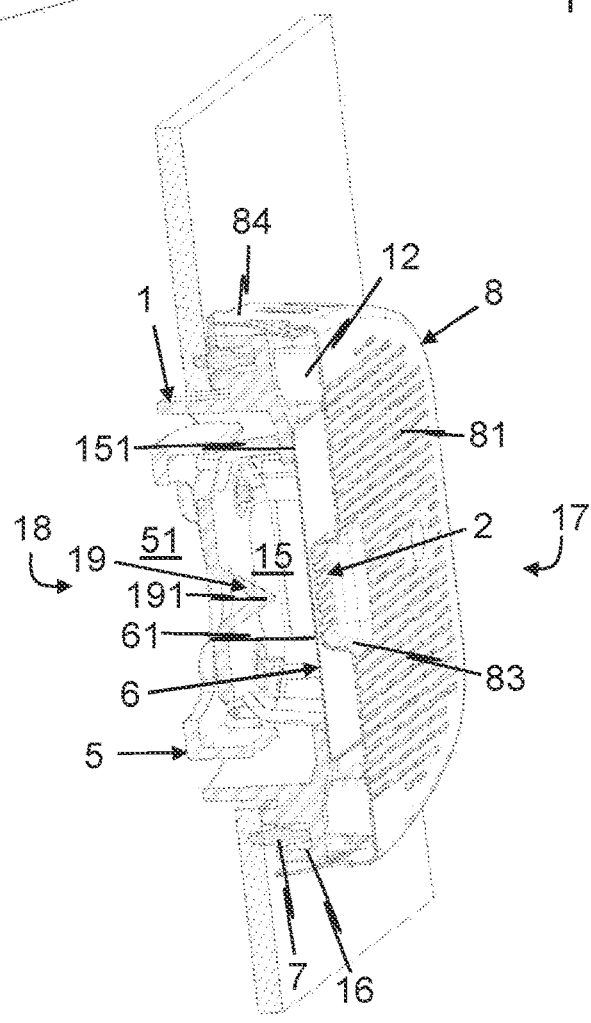
FIG. 4 shows an isometric section view of the degassing unit according to the invention according to the second embodiment.
Figure 5:
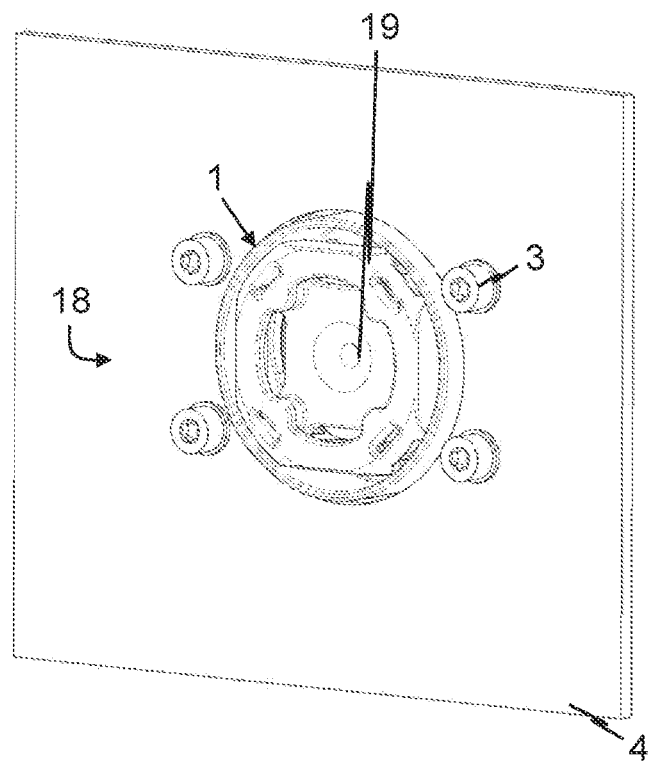
FIG. 5 shows a further isometric view of the degassing unit according to the invention according to the second embodiment from the exterior.
Figure 6:
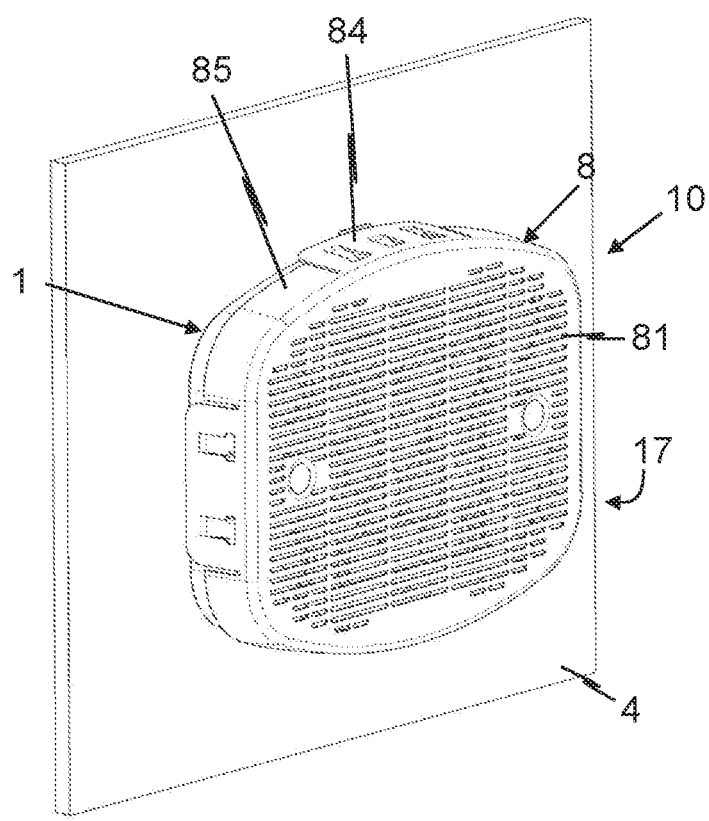
FIG. 6 shows an isometric view of a degassing unit according to the invention according to a third embodiment.
Figure 7:
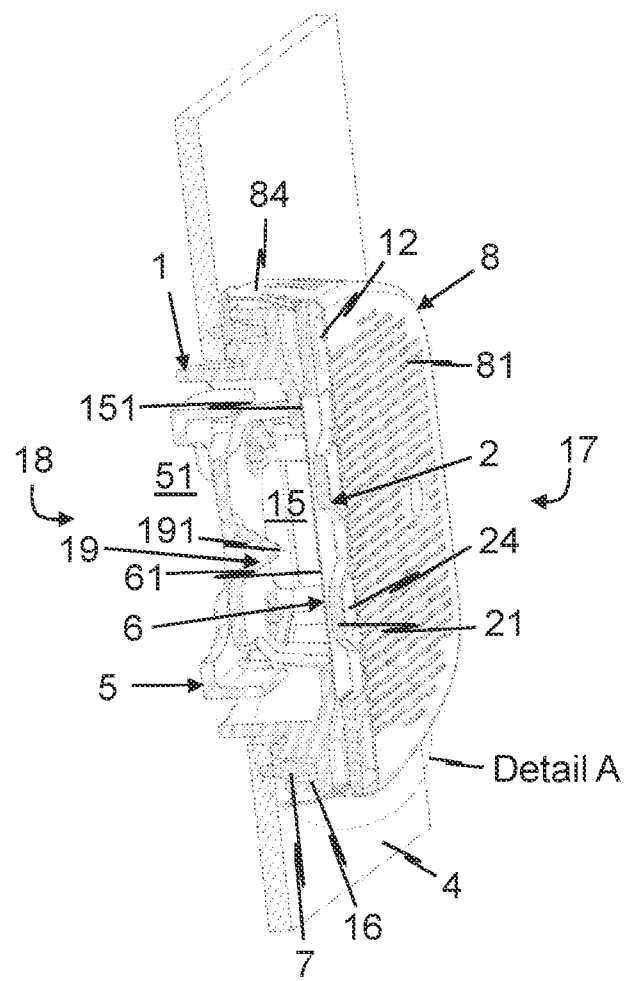
FIG. 7 shows an isometric section view of the degassing unit according to the invention according to the third embodiment.

According to the second embodiment illustrated in FIG. 3 to FIG. 5, the membrane support device 2 is embodied as one piece together with the separation lattice 8. The degassing unit 10 is arranged at the interior side at the wall 4 of the electronics housing and is screwed on from the exterior.

The separation lattice 8 comprises an engagement region 84 which engages the base body 1 radially outwardly in circumferential direction. In the engagement region 85, the detachable fastening of the separation lattice 8 to the base body 1 by snap-on means 84 of the separation lattice 8 is realized which are snapped into respective corresponding snap receptacles of the base body 1. The engagement of the separation lattice 8 extending circumferentially in this way increases the stiffness of the separation lattice 8, on the one hand, and contributes to an improved particle seal-tightness, on the other hand. The membrane support device 2 according to this embodiment is formed as an axial bulge 83 or depression of the separation lattice 8. The membrane support device 2 is provided by an axially displaced fluid-permeable lattice section of the separation lattice 8 which is arranged approximately centrally relative to the gas passage opening 15 and is present at a first distance away from the membrane 6 while the sections of the separation lattice 8 which are not axially displaced are positioned at a second distance away from the membrane 6 that is larger than the first distance. This embodiment has the decisive advantage that the separation lattice 8 with integrated membrane support device 2 can be produced by a single process (for example, stamping and shaping) and that the mounting expenditure is minimized because only one mounting step (snapping on the separation lattice 8) is required. The base body 1 has moreover a plurality of spacers 12 which extend away inwardly in axial direction and on which the separation lattice 8 is resting in order to keep the latter at the predetermined second distance away from the membrane 6. The spacers 12 are arranged circumferentially distributed about the gas passage opening 15 in order to support the separation lattice 8 as uniformly as possible. In an embodiment that is not illustrated, the spacers can also be formed at the separation lattice 8 and extend in radial direction outwardly in order to rest on the base body 1.

FIG. 5 shows the degassing unit 10 according to the invention in the mounted state from the exterior without mounted covering cap. With respect to the screw connection and sealing action, the second embodiment corresponds to the first embodiment described above.

Figure 8:
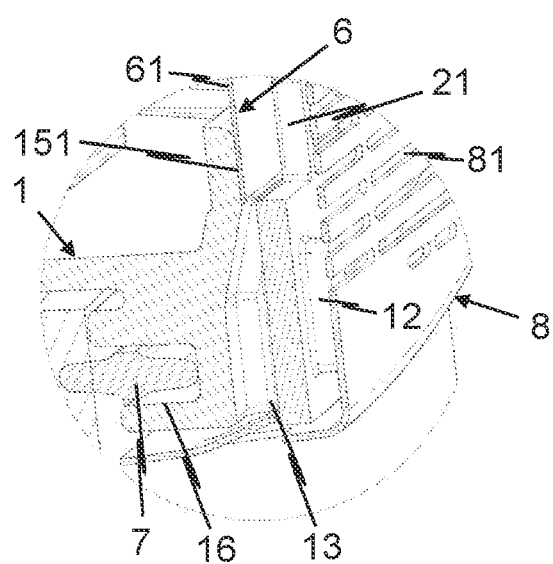
FIG. 8 shows detail A of FIG. 7.

In FIG. 6 to FIG. 9, a third embodiment of the degassing unit 10 according to the invention is illustrated. Functionally, the latter corresponds to the first and second embodiments described above so that only the differences will be explained. The main difference in comparison to the second embodiment resides in the separate embodiment of the separation lattice 8 and of the membrane support device 2. The membrane support device 2 is embodied as a part of the base body 1 and connected thereto by material fusion, in particular welded, and comprises a lattice stay structure 21 that is in particular of a honeycomb shape between which the lattice openings 24 are present. The shape of the lattice stay structure 21 can also deviate from the honeycomb shape in embodiments that are not illustrated. The membrane support device 2 is arranged again at a first distance away from the membrane 6. An embodiment as one piece together with the base body 1 has the advantage that the membrane support device 2 can be produced (for example, by injection molding) together with the base body 1. The membrane support device 2 can be comprised of the same material as the support body 1, for example, of a thermoplastic plastic material, for example, of polypropylene, polybutylene terephthalate or polyamide, each comprising reinforcement fibers, in particular glass fibers, and can therefore be welded without problems to the base body 1. The separation lattice 8 which is of a planar configuration (no bulging or depression) is detachably connected to the base body 1. In regard to the function of the spacers 12 and the attachment of the separation lattice 8 in the engagement region 85 with the base body 1, reference is being had to the explanations in regard to the second embodiment. In FIG. 8, the detachable connection of the separation lattice 8 to the base body 1 by means of snap means 84 of the separation lattice 8, which engage in corresponding snap receptacles 13 of the base body 1, is shown as detail A.

Figure 9:
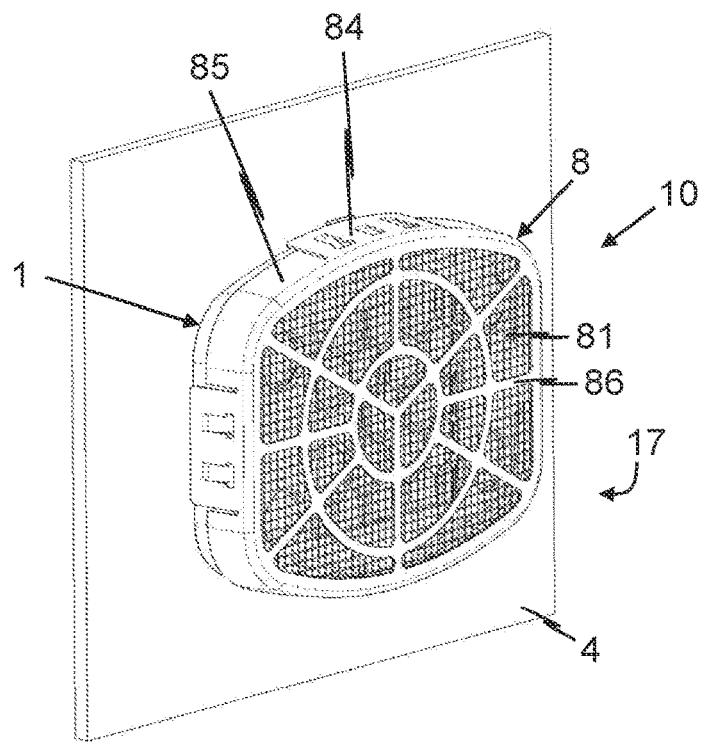
FIG. 9 shows an isometric view of a degassing unit according to the invention according to a fourth embodiment.
Figure 10:
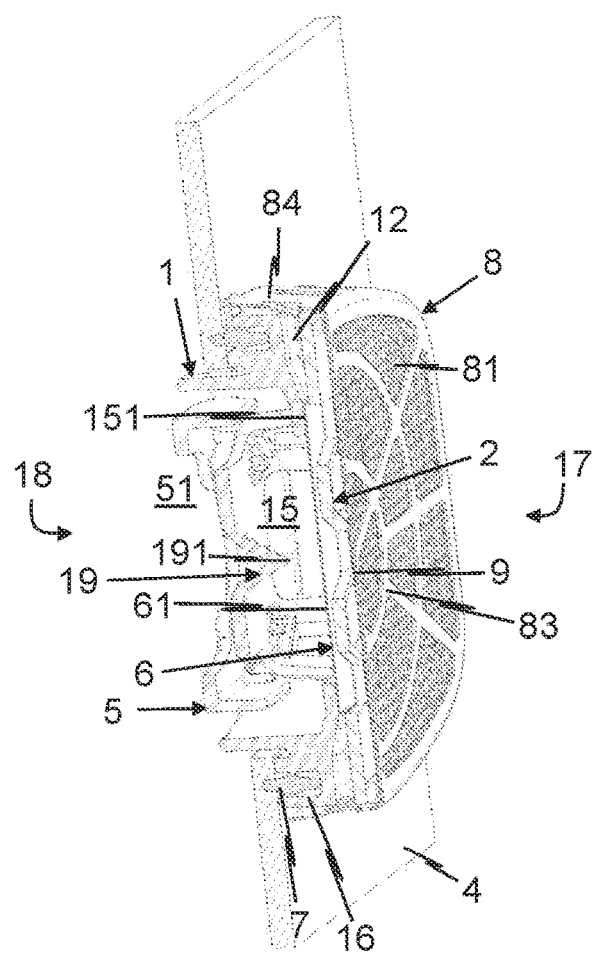
FIG. 10 shows an isometric section view of a degassing unit according to the invention according to the fourth embodiment.

A fourth embodiment of the degassing unit 10 according to the invention is illustrated in FIG. 9 and FIG. 10. It corresponds substantially to the third embodiment but differs in the configuration of the separation lattice 8. The separation lattice 8 supports with the support lattice stays 86 a filter medium 9 which covers the openings 81 which are significantly larger in the fourth embodiment. The filter medium 9 comprises a wire lattice which defines the effective minimal opening cross section. As an alternative or in addition, the filter medium can comprise also a nonwoven material which in particular can be present at the exterior side adjoining the wire lattice, wherein the effective minimal opening cross section is then determined by a pore size of the nonwoven. This embodiment has the advantage that by the use of a separate filter medium 9 significantly smaller effective opening cross sections can be realized so that also finer particle fractions or a larger gravimetric proportion of the total particle fraction can be separated. The filter medium comprises preferably a metallic material, for example, steel, or consists thereof which is advantageous due to the good thermal resistance. Such wire lattices and/or nonwoven media are available on the market.

Figure 11:
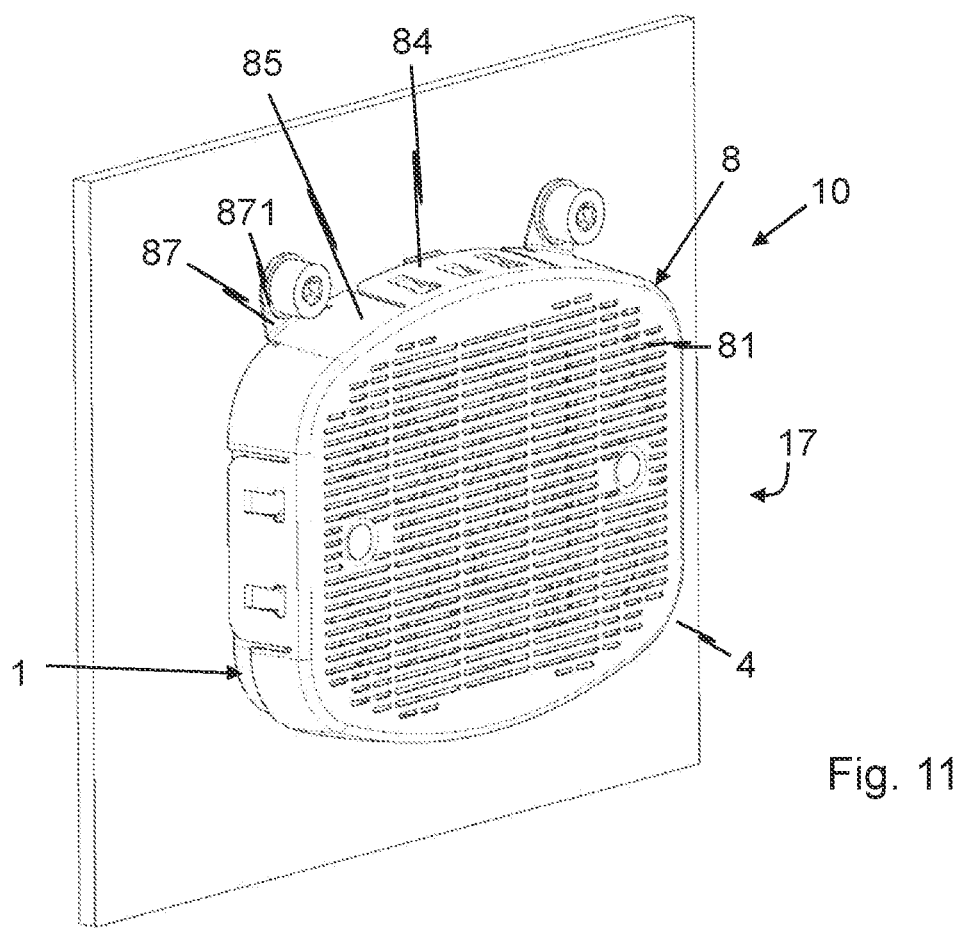
FIG. 11 shows an isometric section view of the degassing unit according to the invention according to a fifth embodiment.

FIG. 11 shows a fifth embodiment of the degassing unit 10 according to the invention. It corresponds substantially to the fourth embodiment according to FIG. 9 and FIG. 10. The difference resides in that the degassing unit 10 according to the fifth embodiment has a fastening tab 87 at its separation lattice 8 which extends radially away from the lattice body of the separation lattice 8. In the fastening tab 87, an opening 871 is present through which a metallic screw is guided, by means of which the separation lattice 8 is connected immediately to the wall 4 of the electronics housing. The technical advantages associated therewith have been discussed in detail in the general part of the description.

LIST OF REFERENCE CHARACTERS

10 degassing unit
1 base body
11 fastening means action region
12 spacer
13 snap-on receptacles of the base body
15 gas passage opening
151 rim of the gas passage opening
16 seal receiving groove of the base body
17 interior side of the base body
18 exterior side of the base body
19 emergency degassing spike
191 tip of the emergency degassing spike
2 support device
21 lattice stays
24 lattice openings
3 screw
4 wall of the electronics housing
41 through bore of the wall of the electronics housing
5 covering hood
51 venting openings
6 semipermeable membrane
61 outer membrane surface
7 housing seal
8 separation lattice
81 openings of the separation lattice
82 cup-shaped bulge of the separation lattice
83 axial support bulge of the separation lattice
84 snap-on means of the separation lattice
85 engagement region of the separation lattice
86 support lattice stays of the separation lattice
87 fastening tab of the separation lattice
871 opening of the fastening tab
9 filter medium

What is claimed is:

1. A degassing unit for an electronics housing, the degassing unit comprising:

a base body configured to provide a gas or liquid impermeable connection to a rim of a pressure compensation opening of the electronics housing, the base body comprising a gas passage opening and a fastening means action region configured to attach the degassing unit to the electronics housing;

a semipermeable membrane configured to:
 cover the pressure compensation opening of the electronics housing;
 enable passage of gaseous media from an environment into an interior of the electronics housing and from the interior of the electronics housing into the environment; and
 prevent passage of liquid media and solids through the semipermeable membrane;

a membrane support device arranged at an interior side of the base body facing the interior of the electronics housing in a mounted state of the degassing unit, the membrane support device engaging at least partially across the gas passage opening, and the membrane support device being positioned at a first distance away from the semipermeable membrane; and a separation lattice comprising lattice openings, the separation lattice being arranged at the interior side of the base body at a second distance away from the semipermeable membrane, the second distance being larger than the first distance, and the separation lattice completely engaging across the gas passage opening, wherein a portion of the separation lattice directly contacts a portion of the membrane support device, a bottom surface of the separation lattice faces an exterior of the electronics housing, extends from the contacted portion of the membrane support device and away from a surface of the membrane support device facing the interior of the electronics housing, and overlaps the surface of membrane support device or a surface of the semipermeable membrane facing the interior of the electronics housing, and a surface area spanned by the separation lattice is larger than a cross section area of the gas passage opening such that the lattice openings extend radially outwardly beyond and overlap the gas passage opening.

2. The degassing unit according to claim 1, wherein the membrane support device is gas or liquid permeable.

3. The degassing unit according to claim 2, wherein the membrane support device is a lattice section with a plurality of lattice openings.

4. The degassing unit according to claim 1, wherein the lattice openings of the separation lattice have a dimension in at least one extension direction that is smaller than 2.0 mm and are sized to block passage of a substantial mass portion of hot metal and/or alkali metal particles that are generated by a battery cell defect or failure while enabling gases that are generated by the battery cell defect to escape through the separation lattice into the environment.

5. The degassing unit according to claim 1, wherein the semipermeable membrane is arranged at the interior side of the base body and is at least partially engaged from behind by the membrane support device.

6. The degassing unit according to claim 1, wherein the separation lattice is bulged cup-shaped in a direction pointing inwardly into the interior of the electronics housing in the mounting state of the degassing unit.

7. The degassing unit according to claim 1, wherein the separation lattice is substantially of a planar configuration.

8. The degassing unit according to claim 1, further comprising at least one spacer directly interposed between the interior side of the base body and the bottom surface of the separation lattice and holding the separation lattice at the second distance away from the semipermeable membrane, wherein the at least one spacer is either projecting axially inwardly directly away from the base body or projecting axially outwardly directly away from the separation lattice.

9. The degassing unit according to claim 1, wherein dimensions of lattice openings of the membrane support device are larger than dimensions of the lattice openings of the separation lattice.

10. The degassing unit according to claim 1, wherein the separation lattice and the membrane support device are embodied separate from each other.

11. The degassing unit according to claim 1, wherein the separation lattice and the membrane support device are embodied together as one piece.

12. The degassing unit according to claim 11, wherein the membrane support device is embodied as an axial support bulge of the separation lattice.

13. The degassing unit according to claim 12, wherein the axial support bulge is arranged centrally in relation to the gas passage opening.

14. The degassing unit according to claim 12, wherein the axial support bulge of the separation lattice forms a lattice section of the membrane support device.

15. The degassing unit according to claim 1, further comprising a filter medium directly disposed on the bottom surface of the separation lattice, wherein the filter medium comprises a lattice material and/or a nonwoven material.

16. The degassing unit according to claim 15, wherein the filter medium comprises a metallic material or consists of a metallic material.

17. The degassing unit according to claim 1, wherein the separation lattice is non-detachably or detachably connected to the base body.

18. The degassing unit according to claim 17, wherein the separation lattice is detachably snapped onto the base body.

19. The degassing unit according to claim 1, wherein a distance between the separation lattice and the membrane support device in a region of a center of the gas passage opening amounts to at least 0.2 mm.

20. The degassing unit according to claim 1, wherein the fastening means action region of the base body comprises a bore open toward the interior side of the base body and/or an exterior side of the base body.

21. The degassing unit according to claim 1, wherein the separation lattice is a sheet metal part.

22. The degassing unit according to claim 21, wherein the separation lattice comprises at least one opening aligned with at least one blind bore of the base body, the at least one opening configured to receive a fastener to hold and fasten the separation lattice in a position in relation to the rim of the pressure compensation opening of the electronics housing.

23. The degassing unit according to claim 1, wherein the separation lattice comprises at least one fastening tab, wherein the at least one fastening tab is configured to connect the separation lattice immediately to a housing wall of the electronics housing.

24. The degassing unit according to claim 1, further comprising a covering hood connected to an exterior side of the base body.

25. The degassing unit according to claim 24, wherein the covering hood comprises at least one venting opening.

26. The degassing unit according to claim 24, wherein the covering hood is fastened by a locking element to the base body.

27. The degassing unit according to claim 1, further comprising a housing seal circumferentially surrounding the gas passage opening of the base body at the interior side of the base body.

28. The degassing unit according to claim 1, further comprising an emergency degassing spike arranged externally in relation to the semipermeable membrane and extending in an axial direction toward the semipermeable membrane, the emergency degassing spike comprising a tip, and the tip, in a state of rest, being positioned at a predetermined distance away from an outer membrane surface of the semipermeable membrane, wherein the outer membrane surface is facing away from the interior of the electronic housing.

29. The degassing unit according to claim 28, wherein the emergency degassing spike is formed at the base body or at a covering hood connected to the base body.

30. An electronics housing comprising a housing wall comprising a pressure compensation opening being closed by the degassing unit according to claim 1.

31. The electronics housing according to claim 30, wherein the degassing unit is connected by at least one fastening means to the housing wall, the at least one fastening means engaging the fastening means action region of the base body of the degassing unit, and the separation lattice is secured between the housing wall of the electronics housing and the base body of the degassing unit.

32. The electronics housing according to claim 31, wherein the separation lattice is indirectly secured with form fit and/or friction fit between the housing wall of the electronics housing and the base body of the degassing unit.

33. The electronics housing according to claim 31, wherein the separation lattice is directly secured with form fit and/or friction fit between the housing wall of the electronics housing and the base body of the degassing unit.

34. The electronics housing according to claim 31, wherein the separation lattice is connected immediately to the housing wall of the electronics housing by the at least one fastening means, and the at least one fastening means is a metallic fastening element guided through an opening of at least one fastening tab of the separation lattice.

35. The electronics housing according to claim 30, wherein the electronics housing is a battery housing configured to accommodate battery cells.

* * * * *